US006568590B2

(12) United States Patent
Iguchi

(10) Patent No.: US 6,568,590 B2
(45) Date of Patent: May 27, 2003

(54) ELECTRONIC CASH REGISTER AND A METHOD OF DISPLAYING A PROCESSING RESULT IN AN ELECTRONIC CASH REGISTER

(75) Inventor: Kesayoshi Iguchi, Fujisawa (JP)

(73) Assignee: Matsushita Electric Industrial Co., Osaka (JP)

( * ) Notice: Subject to any disclaimer, the term of this patent is extended or adjusted under 35 U.S.C. 154(b) by 0 days.

(21) Appl. No.: 09/316,359

(22) Filed: May 21, 1999

(65) Prior Publication Data

US 2002/0074395 A1 Jun. 20, 2002

(30) Foreign Application Priority Data

May 21, 1998 (JP) .......................................... 10-205917

(51) Int. Cl.[7] ................................................ G06F 17/00
(52) U.S. Cl. .......................... 235/375; 905/15; 235/378
(58) Field of Search ................................ 235/375, 376, 235/378, 380; 705/15, 19, 30

(56) References Cited

U.S. PATENT DOCUMENTS 4,707,785 A * 11/1987 Takagi ........................ 235/378
5,235,509 A * 8/1993 Mueller et al. ............... 364/15
5,377,097 A * 12/1994 Fuyama ....................... 705/15
5,499,040 A * 3/1996 McLaughlin et al. ....... 345/146
5,727,162 A * 3/1998 Nakamura .................. 395/225
5,867,140 A * 2/1999 Rader .......................... 345/98
5,943,655 A * 8/1999 Jacobson ..................... 705/30
6,005,544 A * 12/1999 Eglit .......................... 345/115
6,049,780 A * 4/2000 Fuyama ....................... 705/15
6,084,528 A * 7/2000 Beach et al. ........... 340/825.35
6,133,844 A * 10/2000 Ahne et al. .............. 340/815.4

FOREIGN PATENT DOCUMENTS

JP 355032178 A * 3/1980
JP 407320163 A * 12/1995
JP 411339126 A * 12/1999

OTHER PUBLICATIONS

Microsoft Visual C++, Class Library Reference for the Microsoft Foundation Class Library, vol. 1, 1993, p. 181–182.*

* cited by examiner

*Primary Examiner*—Diane I. Lee
(74) *Attorney, Agent, or Firm*—Connolly Bove Lodge & Hutz LLP

(57) ABSTRACT

An electronic cash register displays images for an article key receiving process and a total key response process on a screen, and in response to a first function key (IN indicative of eating inside), displays font data of a mark. Display attribution of the display is changed in accordance with the processing condition. That is, in response to the first function key, the background color at a predetermined area is changed in response to the first or second function key. An indicator for emitting a plurality of color rays indicates the processing condition with one of the color rays.

20 Claims, 15 Drawing Sheets

| CODE | CHR | CODE | CHR | CODE | CHR |
|---|---|---|---|---|---|
| 2341 | A | 2350 | P | 2221 | ◇ |
| 2342 | B | 2351 | Q | 2222 | □ |
| 2343 | C | 2352 | R | 2223 | □ |
| 2344 | D | 2353 | S | | |
| 2345 | E | 2354 | T | | |
| 2346 | F | 2355 | U | | |
| 2347 | G | 2356 | V | | |
| 2348 | H | 2357 | W | | |
| 2349 | I | 2358 | X | | |
| 234A | J | 2359 | Y | | |
| 234B | K | 235A | Z | | |
| 234C | L | 235B | □ | | |
| 234D | M | 235C | □ | | |
| 234E | N | □ | | | |
| 234F | O | □ | | | |

*FIG. 4*

| FUNCTION KEY | CODES | | | |
|---|---|---|---|---|
| OUT | 2222, | 2222, | 2222, | 2222 |
| IN | 2223, | 2223, | 2223, | 2223 |

*FIG. 5*

IN

| | | | | |
|---|---|---|---|---|
| 1 | HB SET<br>HAMBURGER | 500 | SUBTOTAL | 1, 050 |
| | | | TAX | 53 |
| | FRIED POTATO | | TOTAL | 1, 103 |
| 1 | COLA (SET) | | | |
| 1 | CHEESEBURGER | 250 | | |
| 1 | COFFEE | 300 | | |

( BACKGROUND IS WHT & CHRS ARE BLK )

FIG. 9

OUT

| | | | | |
|---|---|---|---|---|
| 1 | HB SET<br>HAMBURGER | 500 | SUBTOTAL | 1, 050 |
| | | | TAX | 53 |
| | FRIED POTATO | | TOTAL | 1, 103 |
| 1 | COLA (SET) | | | |
| 1 | CHEESEBURGER | 250 | | |
| 1 | COFFEE | 300 | | |

( BACKGROUND IS BLK & CHRS ARE WHT )

FIG. 10

ELECTRONIC CASH REGISTER AND A METHOD OF DISPLAYING A PROCESSING RESULT IN AN ELECTRONIC CASH REGISTER

BACKGROUND OF THE INVENTION

1. Field of the Invention

This invention relates to an electronic cash register and a method of displaying a processing result in an electronic cash register.

2. Description of the Prior Art

An electronic cash register including a key board including article keys, function keys, and a total key, a microprocessor for processing, and a display such as an LCD, for displaying the result of the calculation is known.

SUMMARY OF THE INVENTION

The aim of the present invention is to provide an improved electronic cash register and an improved method of displaying a processing result in an electronic cash register.

According to the present invention, a first electronic cash register is provided which includes: a key board including article keys, a first function key indicative of eating inside the shop and second function key indicative of taking out, and a total key; a processor responsive to the key board for effecting one of predetermined processes including an article key receiving process and a total key response process; a font data storing portion for storing sets of font data; a setting portion responsive to the key board for generating and storing a first code indicative of a relation between the first function key and a first set of the font data and a second code indicative of a relation between the second function key and a second set of the font data; and a display responsive to the processor for displaying images for the article key receiving process and the total key response process on a screen, reading the first code from the setting portion in response to the first function key, displaying the first set of font data on the screen in accordance with the first code from the setting portion and reading the second code from the setting portion in response to the second function key to display the second set of font data on the screen in accordance with the second code from the setting portion. The first and second sets of the font data indicate font images other than character word images.

According to the present invention, a second electronic cash register is provided which includes: a key board including article keys, a first function key indicative of eating inside the shop, a second function key indicative of taking out, and a total key; a processor responsive to the key board for effecting one of predetermined processes including article key receiving process for receiving input of the article key, a first function key receiving process for receiving input of the first function key, a second function key receiving process for receiving input of the second function key, or a total key response process responsive to the total key at least; a condition judging portion for judging that the article key receiving processing has been just finished, judging that the input of the first function key is received, and judging that the input of the second function key is received; and a display responsive to the processor for displaying images for the article key receiving process and the total key response process on a screen. The display displays a condition of the processor in accordance with the judging result of the condition judging portion with predetermined information other than character words.

The second electronic cash register further includes: a font data storing portion for storing sets of font data; and a setting portion responsive to the key board for generating and storing a code indicative of a relation between one of sets of the font data and one of the predetermined processes, wherein the display reads the code from the setting portion when the judging result indicates one of predetermined processes, and displays the set of font data on the screen in accordance with the code from the setting portion.

In the second electronic cash register, the display includes a display attribution changing portion for changing display attribution at a predetermined area of the screen image in accordance with the judging result of the condition judging portion. In this case, the display attribution changing portion changes display attribution at the predetermined area of the screen image from a first background color to a second background color in accordance with the judging result. In this case, alphanumeric characters on the image for displaying for the article key receiving process may be displayed at the predetermined area and the alphanumeric characters on the image for displaying for the total key response process may be displayed at the predetermined area. On the other hand, the alphanumeric characters on the image for the article key receiving process may be displayed outside the predetermined area.

The second electronic cash register may further includes an indicator for emitting one of predetermined color rays in accordance with the judging result of the condition judging portion.

According to the present invention, a method of displaying processing result in an electronic cash register including a key board including article keys, a first function key indicative of eating inside the shop, a second function key indicative of taking out, and a total key and a processor responsive to the key board for effecting either of predetermined processes including article key receiving process for receiving input of the article key, a first function key receiving process for receiving input of the first function key, a second function key receiving process for receiving input of the second function key, or a total key response process responsive to the total key at least and a display is disclosed. The method includes the steps of; judging that the article key receiving processing has been just finished, judging that the input of the first function key is received, and judging that the input of the second function key is received; and displaying images for the article key receiving process and the total key response process on a screen, displaying a condition of the processor in accordance with the judging result with predetermined information other than character words.

BRIEF DESCRIPTION OF THE DRAWINGS

The object and features of the present invention will become more readily apparent from the following detailed description taken in conjunction with the accompanying drawings in which:

FIG. 4 is a table of the first embodiment showing a font table storing font data and indicting relation between codes and corresponding sets of font data;

FIG. 5 is a table of the first embodiment showing a code table showing a relation of the function keys and codes;

FIGS. 8, 9, and 10 are illustrations of a second embodiment showing screen images;

The same or corresponding elements or parts are designated with like references throughout the drawings.

DETAILED DESCRIPTION OF THE INVENTION

<First Embodiment>

Figure 1:
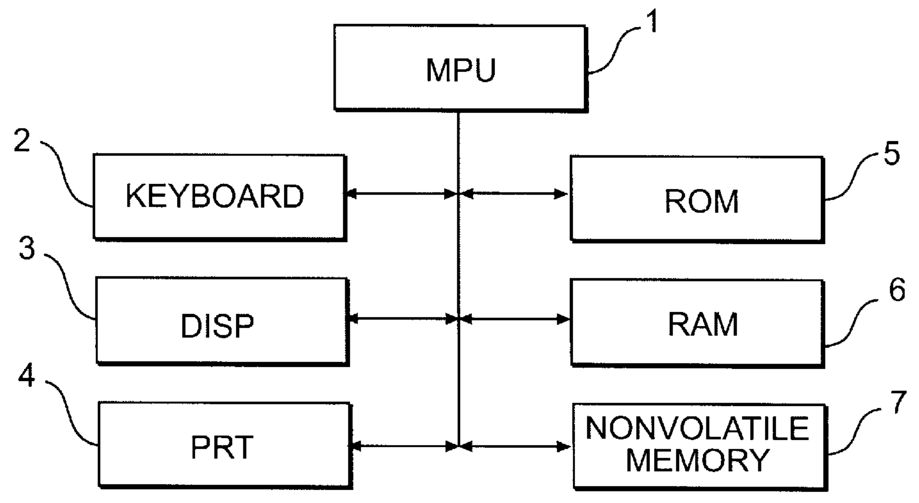
FIG. 1 is a block diagram of an electronic cash register of a first embodiment of this invention which is also used in second to fourth embodiments.
Figure 2:
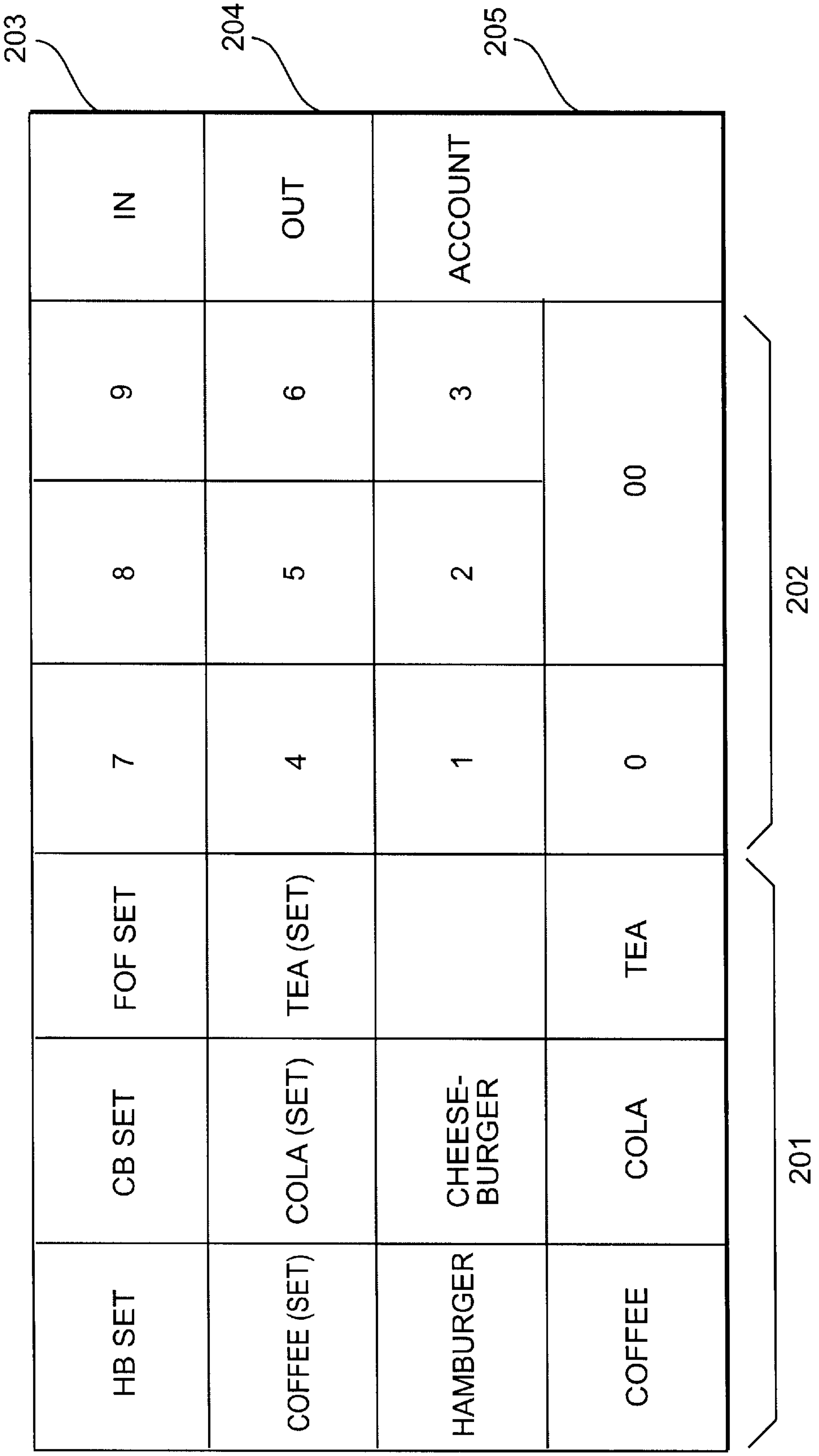
FIG. 2 is a plan view of a keyboard of the first embodiment which is also used in other embodiments in this specification.

FIG. 1 is a block diagram of an electronic cash register of a first embodiment of this invention which is also used in second to fourth embodiments in this specification. FIG. 2 is a plan view of a keyboard of the first embodiment which is also used in other embodiments in this specification.

The electronic cash register of the first embodiment comprises a microprocessing unit (MPU) 1, a keyboard 2, a display 3, a printer 4, a ROM (Read Only Memory) 5, a RAM (Random Access Memory) 6, and a non-volatile memory 7.

The microprocessing unit 1 effects processes such as an article key inputting process, a functional key inputting process, a total key response process in accordance with programs stored in the ROM 5 in response to the keyboard 2. The ROM 5 further stores sets of font data. The display 3 includes an LCD (Liquid Crystal Display) for displaying processing results and the condition of processing. The printer 4 prints the processing results to provide a receipt. The keyboard 2 includes article keys 201, ten keys 202, a first function key 203 indicating that the customer desires for eating inside the shop, a second function key 204 indicating that the customer desires for taking out, and an account key 205.

The non-volatile memory 7 stores codes corresponding to font data in the ROM 5 in response to a manual operation by an operator through the keyboard 2 and other data mentioned later.

Figure 3:
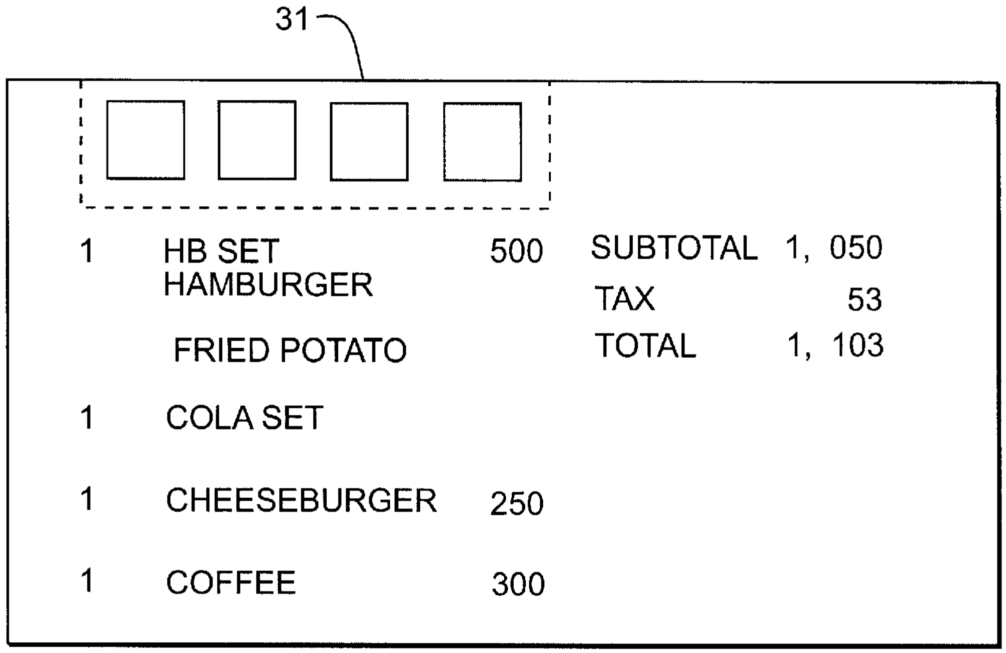
FIG. 3 is an illustration of the first embodiment showing an example of the screen image on the display.

FIG. 3 is an illustration of the first embodiment showing an example of the screen image on the display 2.

The operator successively depresses one of the article keys 201 on the keyboard 2 in accordance with the request by a customer. The microprocessor 1 effects an article key receiving process, a function key receiving process, a total key process, and an account key process, and displays a screen image as shown in FIG. 3.

In this embodiment, if the first function key 203 is depressed, font data is displayed such as marks ■ ■ ■ ■ on the display 3 to indicate that the customer requests for eating inside the shop and when the second function key 204 is depressed, font data is displayed such as marks □ □ □ □ on the display 3 to indicate that the customer requests for taking out. That is, information other than character words is displayed.

FIG. 4 is a table of the first embodiment showing a font table 15 storing font data and indicting relation between codes and corresponding sets of font data.

The font table 15 is formed in the ROM 5 and includes code data area 11 and font data area 12 which stores font data of alphanumeric character and font data and mark data 13, that is, information other than characters.

FIG. 5 is a table of the first embodiment showing a code table 14 showing a relation of the function keys 203 and 204 and codes.

The code table 14 is provided in the non-volatile memory 7 and stores the codes corresponding to the first and second function keys 203 and 204.

Figure 6:
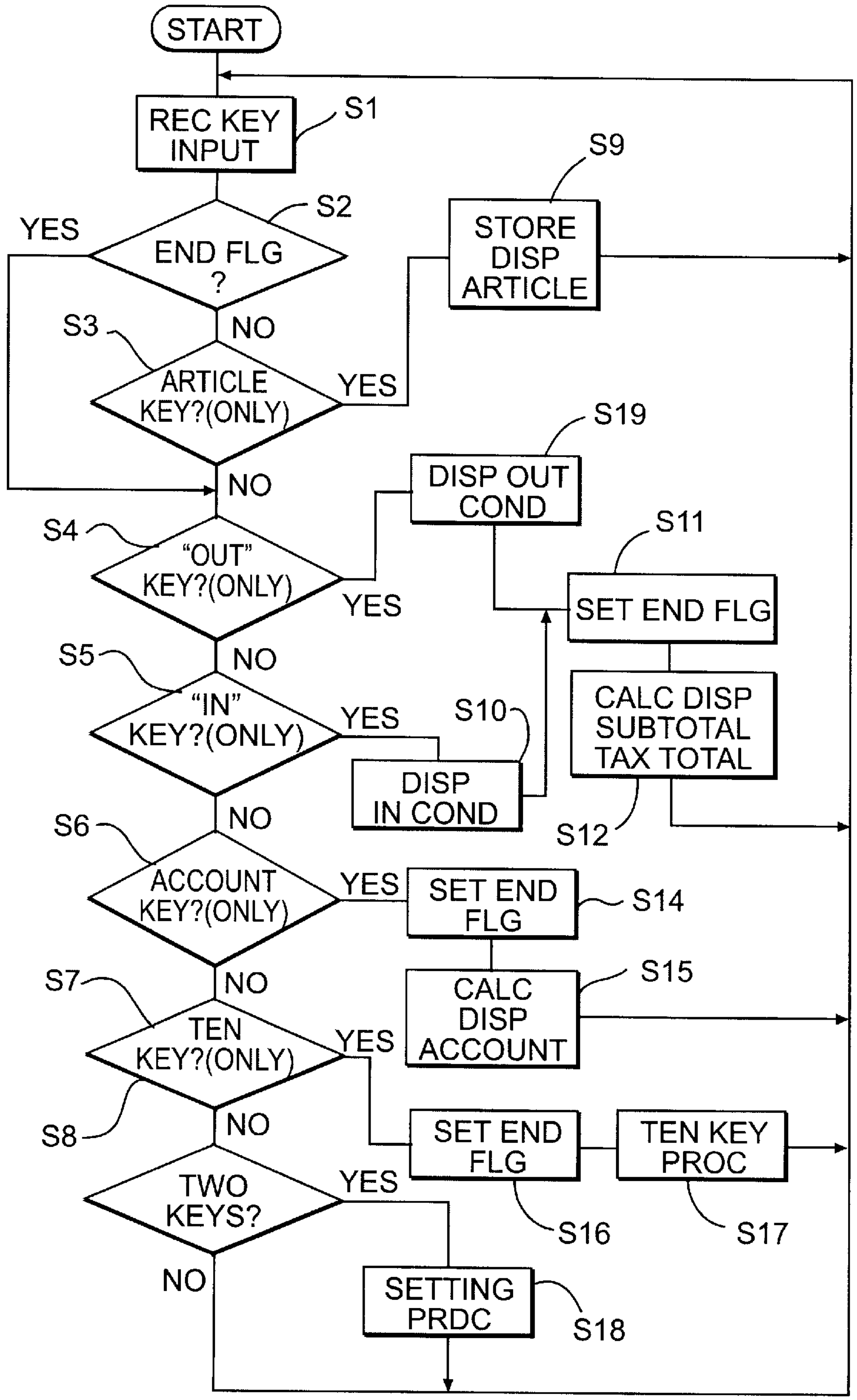
FIG. 6 depicts a flow chart of the first embodiment showing operation by the microprocessor.
Figure 7:
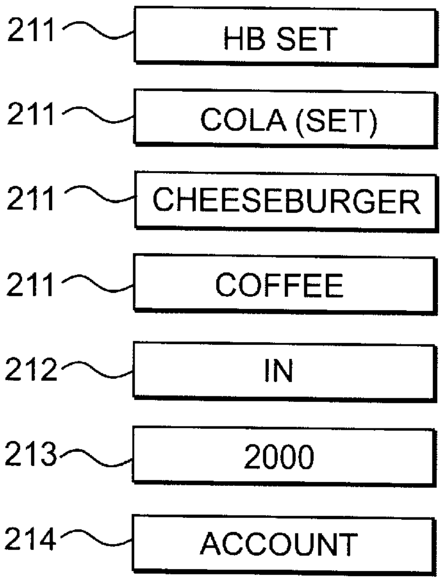
FIG. 7 is an illustration of the first embodiment showing an example of a key operation flow chart.

FIG. 6 depicts a flow chart of the first embodiment showing operation by the microprocessor 1. FIG. 7 is an illustration of the first embodiment showing an example of a key operation flow chart.

The microprocessor 1 receives key input from the keyboard 2 and processing proceeds to step s3 because the end flag is not set in step s2 in the first cycle of this processing, wherein the end flag indicates end of article key input processing, that is, indicates that said article key receiving processing has been just finished.

In step s3, the microprocessor 1 judges whether only one of article keys 201 is inputted. If only one of article keys 201 is inputted, in step s9, the microprocessor 1 stores the data of the depressed article key 201 in the RAM 6 and, as shown in FIG. 3, displays the number of the corresponding article, the name of the article to be sold, and a unit price of the article on a line. The unit price data are previously stored in the non-volatile memory 7. If the same article key 201 is depressed twice the number of the article is changed to two (counted).

During the article key input process (steps s1, s3, and s9), processing loops through steps s1, s3, and s9. That is, the article key input process is executed while the operator depresses the article keys 201 in the key operation step 211 to 211 in FIG. 7.

When the operator depresses one of keys other than the article keys, the article key input process ends by setting the end flag. That is, when the operator depresses the first function key 203 (IN), in operation step 212, the microprocessor 1, receives the function key input in step s1 and in step s5, the microprocessor 1 judges whether the function key 203 is depressed. If function key 203 is depressed, the microprocessor 1 displays the condition that input of the first function key 203 is received as shown in FIG. 3. Then, in step s1, the microprocessor 1 sets the end flag and in step s12, the microprocessor 1 calculates and displays the subtotal, the tax, and the total.

Similarly, if the operator depresses the function key 204 (OUT), the microprocessor 1, receives the function key input in step s1 and in step s4, the microprocessor 1 judges whether the function key 204 is depressed. If function key 204 is depressed in step s4, the microprocessor 1 displays, in step s19, marks □ □ □ 58 on the display 3 to indicate that the customer requests for taking out. Then, the microprocessor 1 sets the end flag and in step s11. Then, in step s12, the microprocessor 1 further calculates the subtotal, the tax, and the total.

Processing returns to step s1 after steps s12. Then, because the end flag is set, in step s2, processing directly proceeds to step s4.

Then, if the operator inputs the amount of the received money in the operation step 213 in FIG. 7, the microprocessor 1 receives the value in step s17 in FIG. 6 and when the operation depresses the account key 205. Then, the operator depresses the account key 205 in the key operation step 214 in FIG. 7, the microprocessor 1 calculates and displays the change in step s15.

The operation in step s10 in FIG. 6 will be described in detail.

In step s10, the microprocessor 1 displays the condition that input of the first function key 203 is received. Then, the microprocessor 1 reads the codes at the code area 22 in the code table 14, i.e., 2223, 2223, 2223, and 2223 from the non-volatile memory 7 and reads the font data ■ ■ ■ ■ in the font table 15 from the ROM 5 and displays the font data at a display area 31 as shown in FIG. 3.

In step s19, the microprocessor 1 displays the condition that input of the second function key 204 is received. Then, the microprocessor 1 reads the codes at the code area 22 in the code table, i.e., 2222, 2222, 2222, 2222 from the non-volatile memory 7 and reads the font data □ □ □ □ in the font table 15 from the ROM 5 and displays the font data at the display area 31.

A setting process will be described.

In step s8, if two keys are depressed at the same time for a predetermined interval, the microprocessor 1 executes the setting process in step s18. These two keys are selected such that two keys remotely locates on the keyboard 2 to prevent error operation.

In the setting process, the microprocessor 1 receives the base setting for inputting the name of the article and the corresponding unit price and stores the corresponding font data and the unit price data in the non-volatile memory 7. In addition, the microprocessor 1 receives the codes in response to the function keys 203 and 204 and stores the codes in the code table in the non-volatile memory 7 as shown in FIG. 5.

<Second Embodiment>

Figure 8:
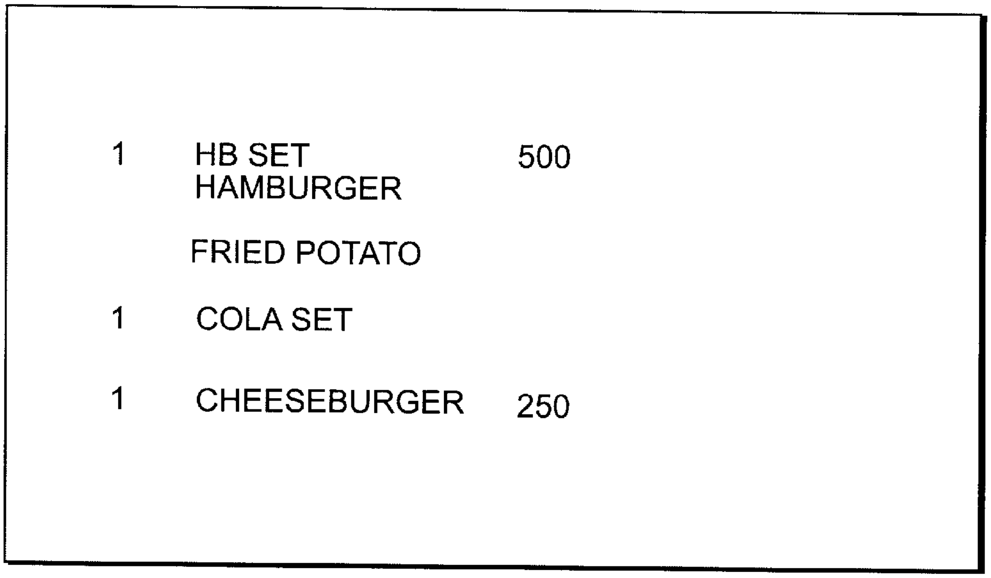

FIGS. 8 to 10 are illustrations of a second embodiment showing screen images.

The electronic cash register of the second embodiment has substantially the same structure as that of the first embodiment. The difference is in that the display 3 comprises a mono-chrome LCD and display attribution at a predetermined area of the screen is changed in accordance with the condition of the processing or changed in accordance with the function keys 203 and 204.

FIG. 8 shows an article key inputting condition where the background (base color) is white and the alphanumeric characters are displayed with a black color (foreground color). FIG. 9 shows the condition that the function key "IN" 203 (eating inside the shop) is depressed, that is, the condition that the article key inputting has finished condition wherein the background (base color) is white and the alphanumeric characters are displayed with a black (foreground color) to indicate that the customer requests for eating inside the shop.

FIG. 10 shows the condition that the function key "OUT" 204 (taking out) is depressed and the condition that the article key inputting has finished, wherein the background (base color) is changed to black and the alphanumeric characters are displayed with white (foreground color) to indicate that the customer requests for taking out.

Figure 11:
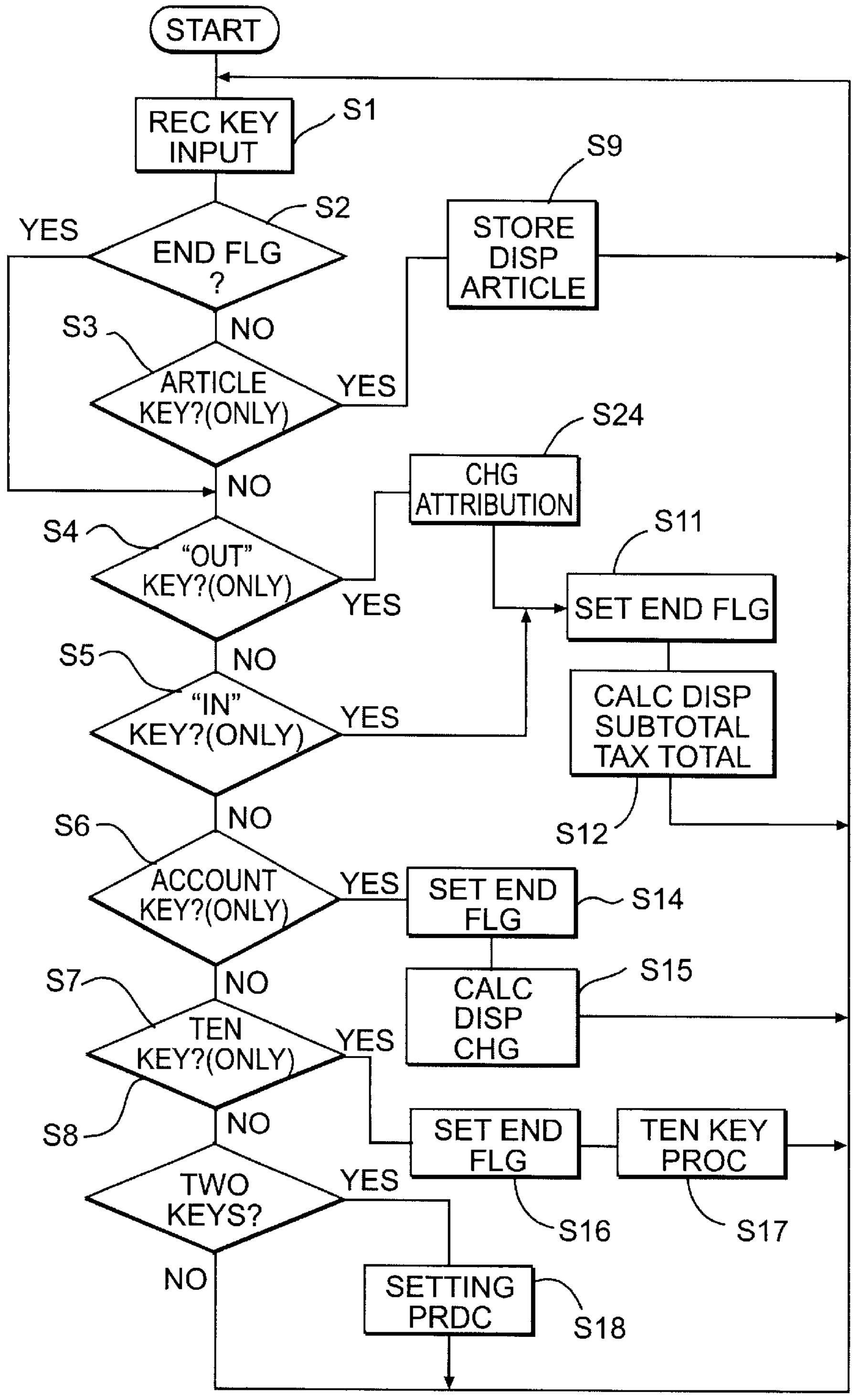
FIG. 11 depicts a flow chart of the second embodiment showing the operation of the microprocessor.

FIG. 11 depicts a flow chart of the second embodiment showing the operation of the microprocessor 1. The processing of the microprocessor 1 of the second embodiment is substantially the same as that of the first embodiment shown in FIG. 6. The difference is that step s24 replaces step s19 and the step s10 is omitted. That is, the microprocessor 1 changes the display attribution of the display 3 in response to the second function key 204 indicative of taking out.

<Third Embodiment>

Figure 12:
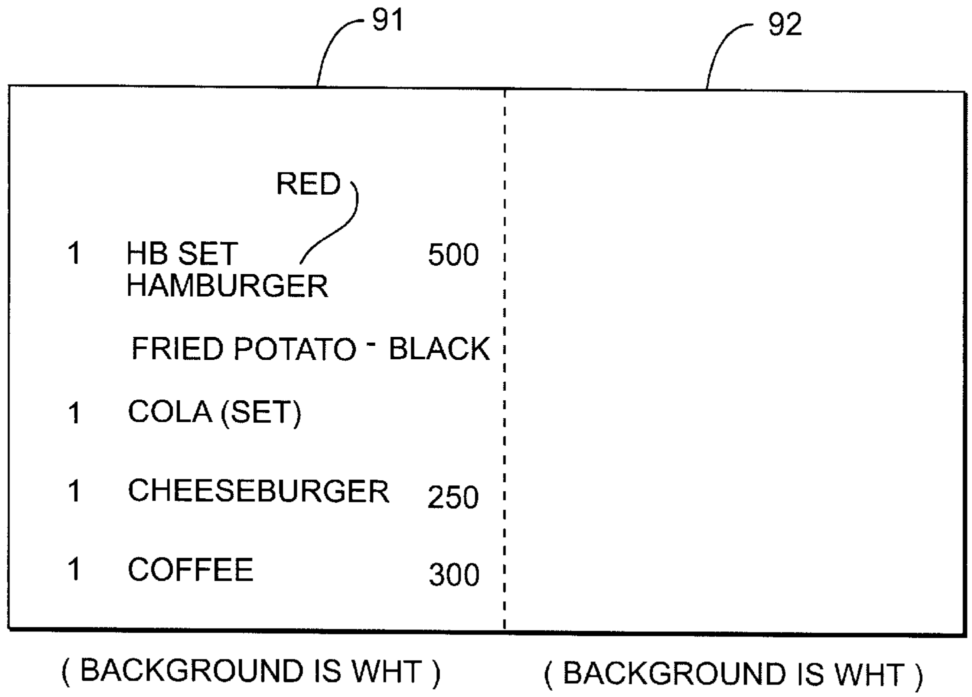
FIGS. 12, 13, and 14 are illustrations of a third embodiment showing screen images.
Figure 13:
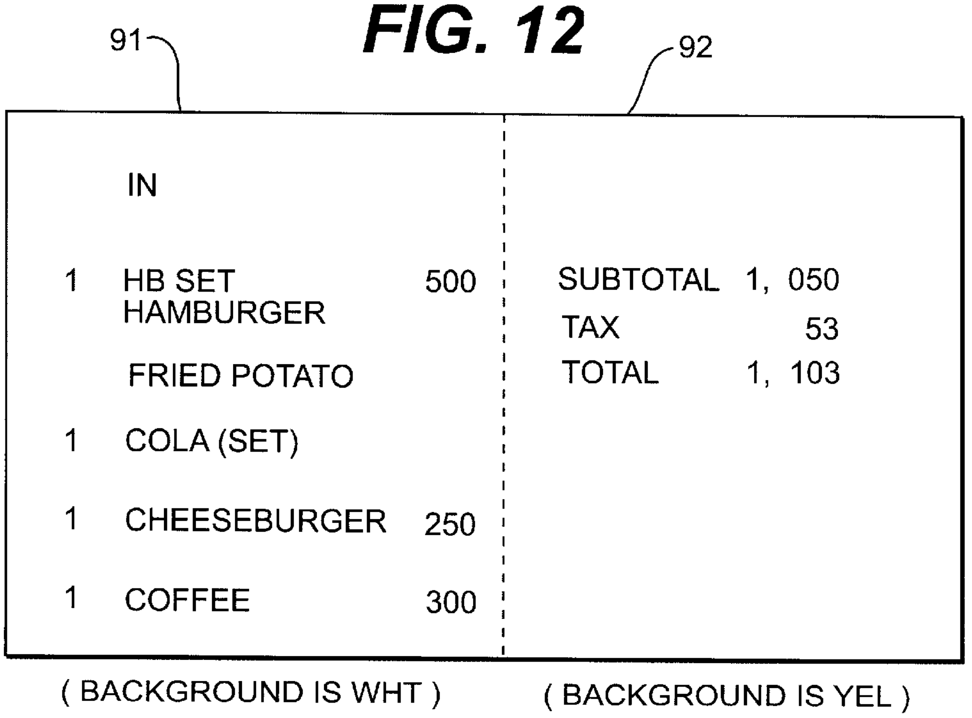
Figure 14:
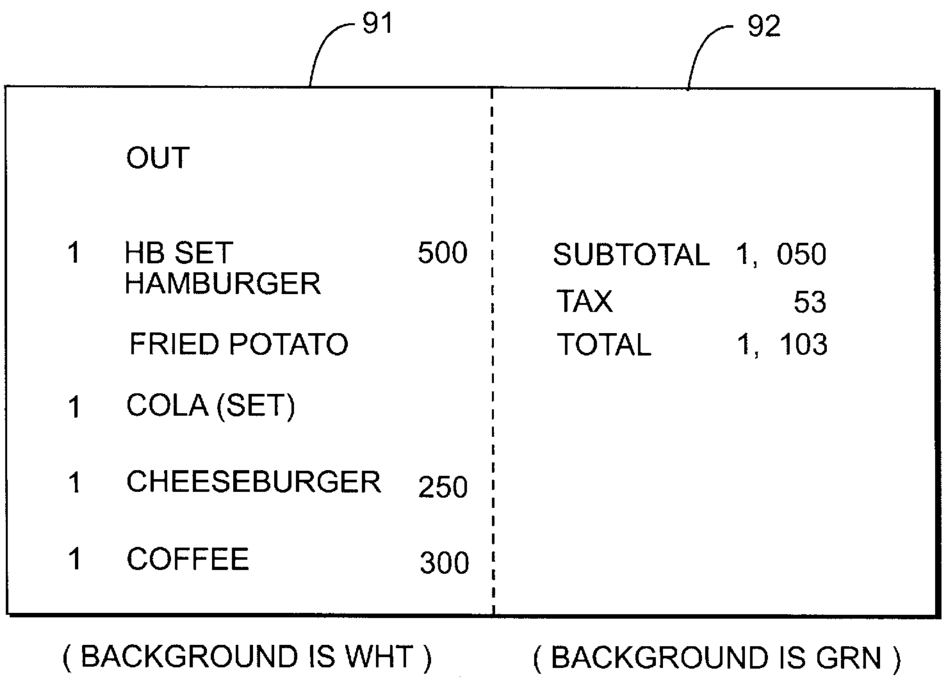

FIGS. 12 to 14 are illustrations of a third embodiment showing screen images.

The electronic cash register of the third embodiment has substantially the same structure as that of the second embodiment. The difference is in that the display 3 comprises a color LCD and has a color display attribution function.

FIG. 12 shows an article key inputting condition where the background (base color) is white at an article display area 91 and a total display area 92 and the alphanumeric characters are displayed with colors other than white (foreground color). For example, sandwiches or the like are displayed with a red color, the fried potato is displayed with a black color, and drinks are displayed with a blue color to provide visual distinction.

FIG. 13 shows the condition that the function key "IN" 203 (eating inside the shop) is depressed, that is, the condition that the article key inputting has finished and the customer requests eating inside, wherein the background (base color) at the article display area 91 remains white. On the other hand, the background color (display attribution) at the total display area 92 is changed into a yellow color.

FIG. 14 shows the condition that the function key "OUT" 204 (taking out) is depressed and the condition that the article key inputting has finished and the customer requests taking out, wherein the background at the article display area 91 remains white and the background at the total display area 92 is changed to green to indicate that the customer requests for taking out.

Figure 15:
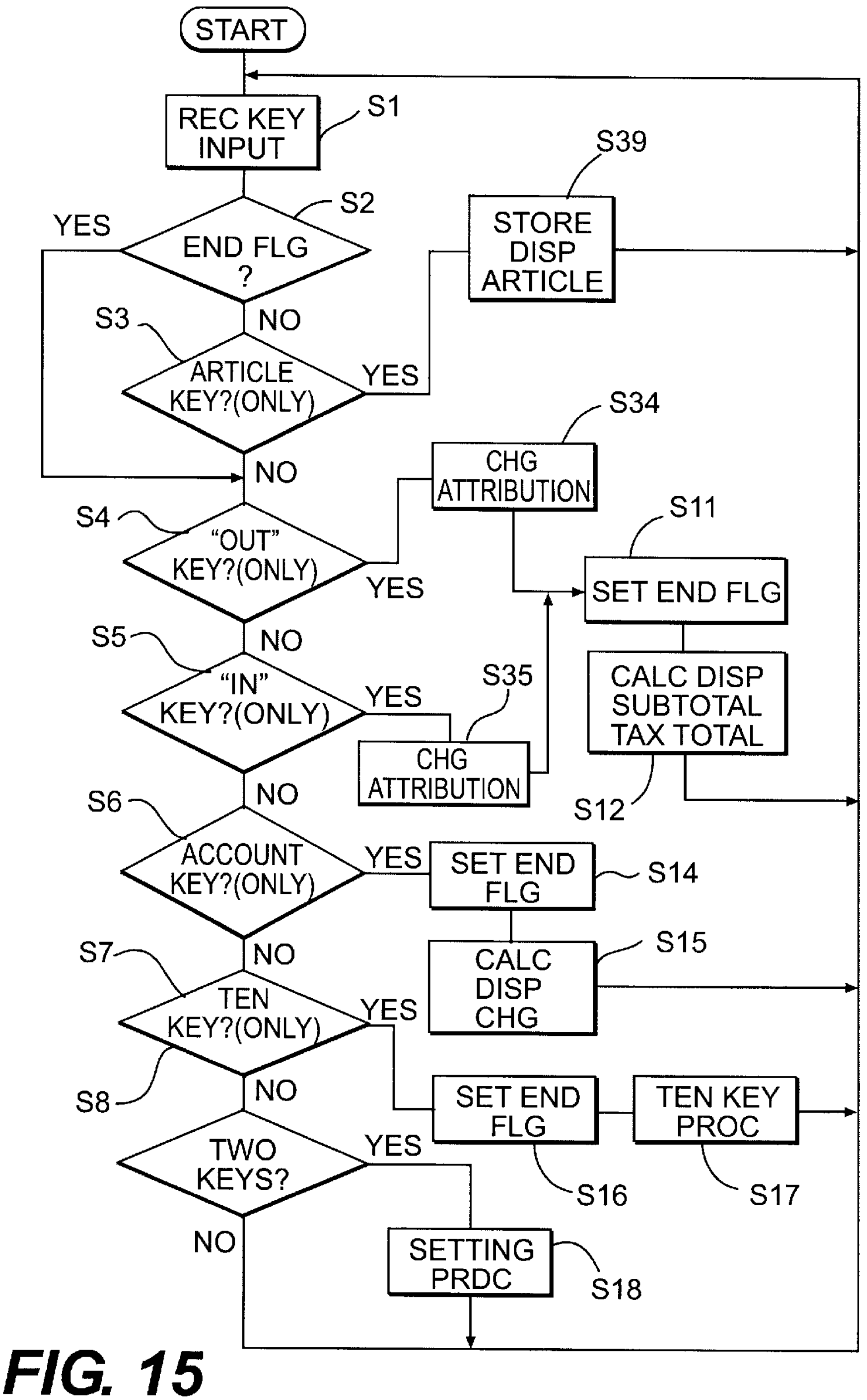
FIG. 15 depicts a flow chart of the third embodiment showing the operation of the microprocessor.

FIG. 15 depicts a flow chart of the third embodiment showing the operation of the microprocessor 1. The processing of the microprocessor 1 of the third embodiment is substantially the same as that of the first embodiment shown in FIG. 6. The difference is that steps s35 replaces step s10 and step s34 is added. That is, the microprocessor 1 changes the color display attribution of the display 3 in response to the first and second second function keys 203 and 204 as shown in FIGS. 12 to 14.

<Fourth Embodiment>

Figure 16:
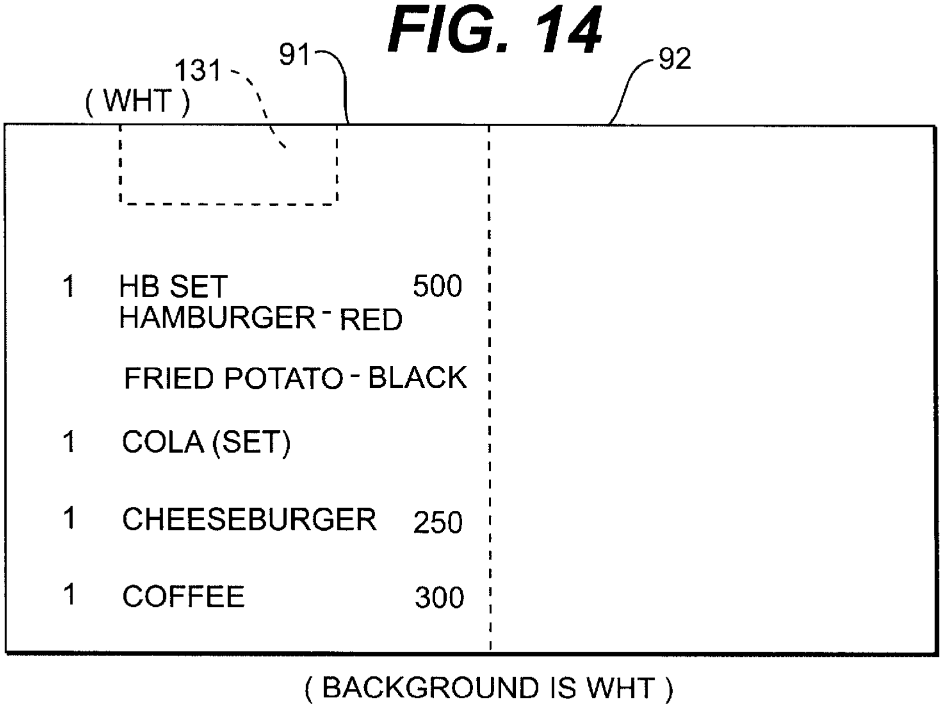
FIGS. 16, 17, and 18 are illustrations of a fourth embodiment showing screen images.
Figure 17:
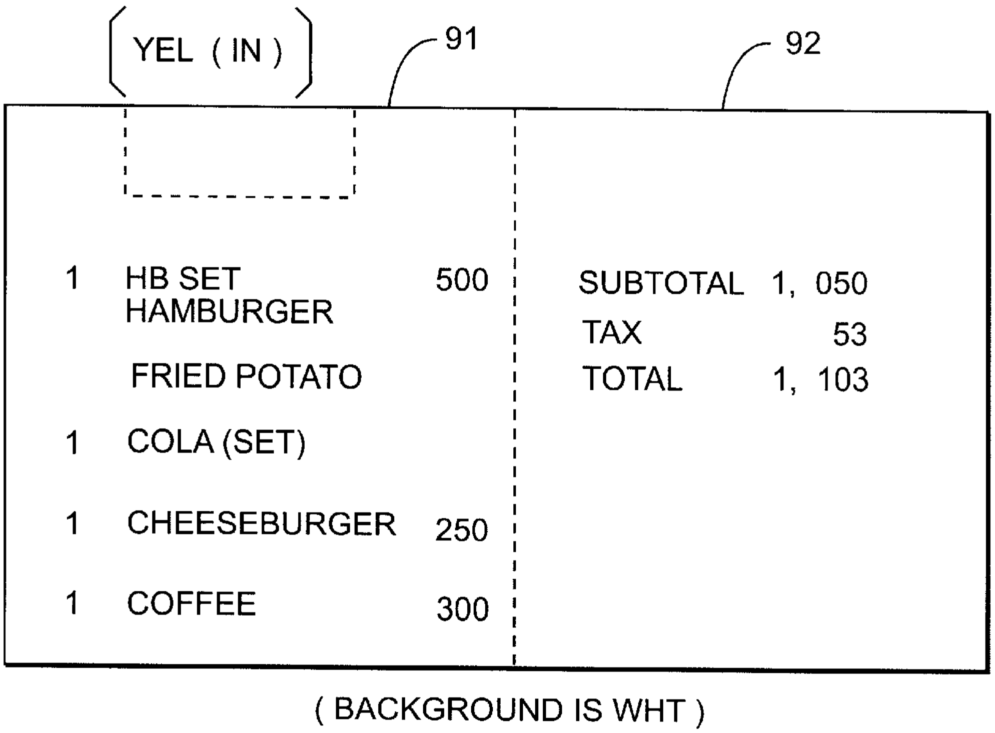
Figure 18:
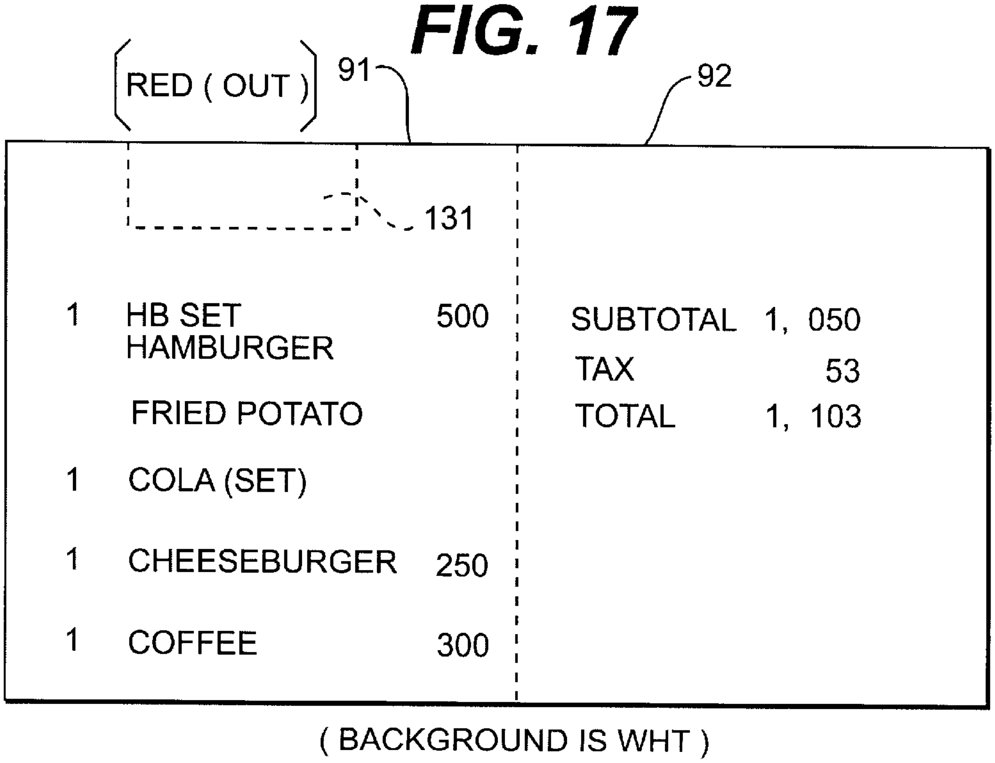

FIGS. 16 to 18 are illustrations of a fourth embodiment showing screen images.

The electronic cash register of the fourth embodiment has substantially the same structure as that of the first embodiment. The difference is in that the display 3 comprises a color LCD and has a color display attribution function.

FIG. 16 shows an article key inputting condition where the background (base color) at the article display area 91 and the total display area 92 is white. In addition, the background at an IN/OUT condition display area 131 within the article display area 91 is white. Characters are displayed with colors other than white (foreground color). For example, sandwiches or the like are displayed with a red color characteristic, the fried potato is displayed with a black color characteristic, and drinks are displayed with a blue color characteristic to provide visual distinction.

FIG. 17 shows the condition that the function key "IN" 203 (eating inside the shop) is depressed, that is, the condition that the article key inputting has finished and the customer requests eating inside, wherein the background (base color) at the IN/OUT condition display area 131 is changed to yellow. On the other hand, the background color (display attribution) remains white.

FIG. 18 shows the condition that the function key "OUT" 204 (taking out) is depressed and the condition that the article key inputting has finished and the customer requests taking out, wherein the background (base color) at the IN/OUT condition display area 131 is changed to red. On the other hand, the background color of the article display area 91 and the total display area 92 remains white.

Figure 19:
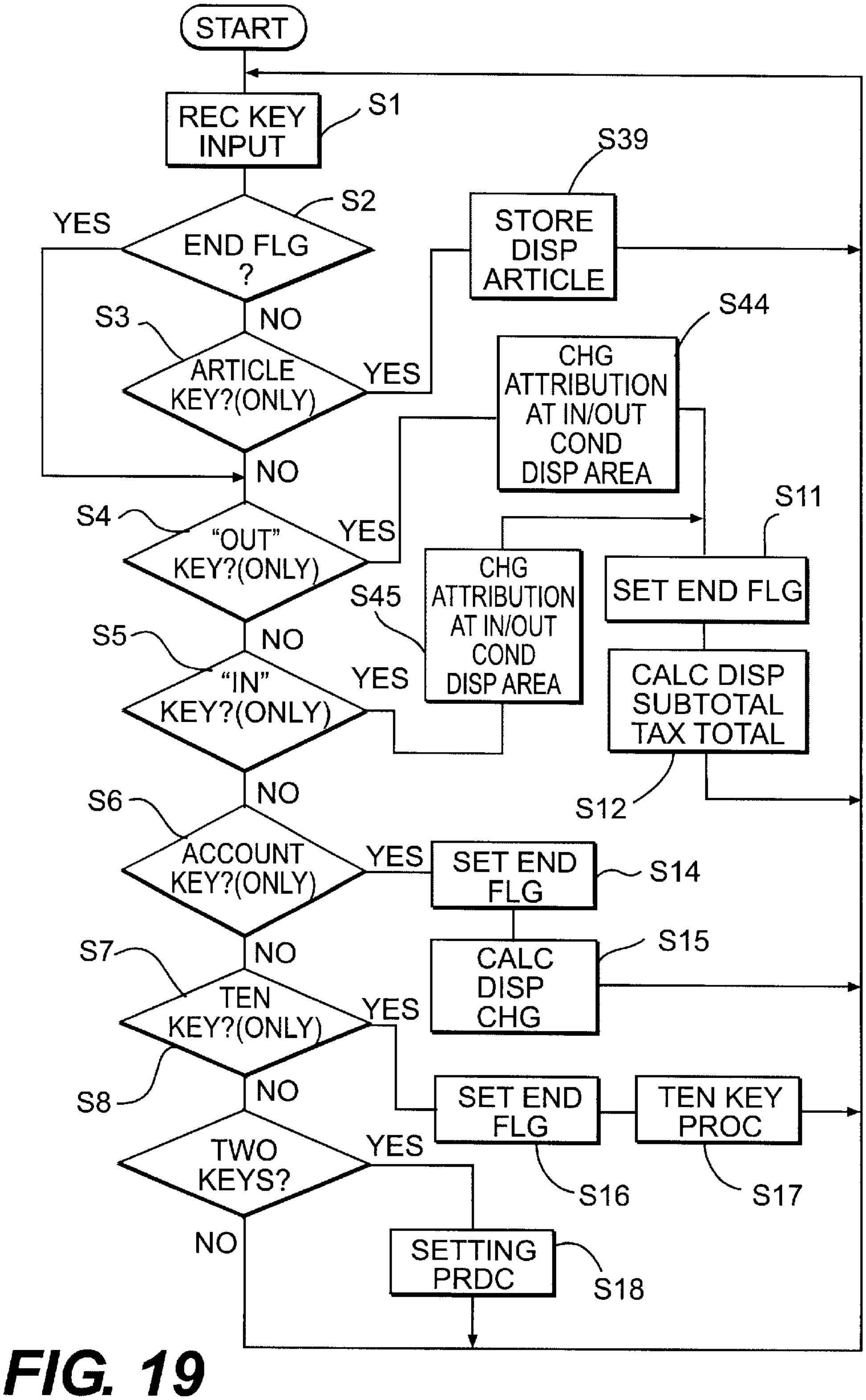
FIG. 19 depicts a flow chart of the fourth embodiment showing the operation of the microprocessor.

FIG. 19 depicts a flow chart of the fourth embodiment showing the operation of the microprocessor 1. The processing of the microprocessor 1 of the fourth embodiment is substantially the same as that of the first embodiment shown in FIG. 6. The difference is that steps s45 replaces step s10 and steps s39 and s44 are added. That is, in response to the first function key 203, the microprocessor 1 changes the display attribution at the IN/OUT condition display area 131 into yellow in step S45 to indicate that the customer requests eating inside and in response to the second function key 204, the microprocessor 1 changes the display attribution at the IN/OUT condition display area 131 into red in step S44 to indicate that the customer requests taking out in response to the second function key 204.

<Fifth Embodiment>

Figure 20:
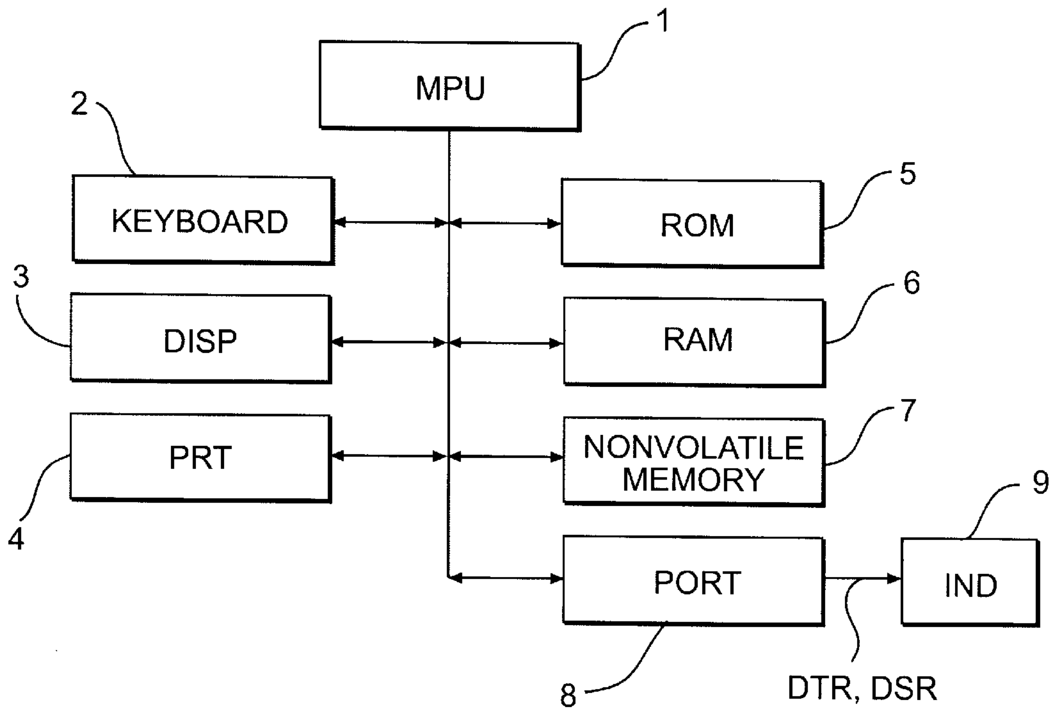
FIG. 20 is a block diagram of an electronic cash register of a fifth embodiment of this invention.

FIG. 20 is a block diagram of an electronic cash register of a fifth embodiment of this invention.

The electronic cash register of the fifth embodiment has substantially the same structure as that of the fourth embodiment. The difference is in that the eating inside condition and the taking out condition is indicated by an indicator 9 provided outside the display 3 and a port 8 is provided to control the indicator 9.

Figure 21:
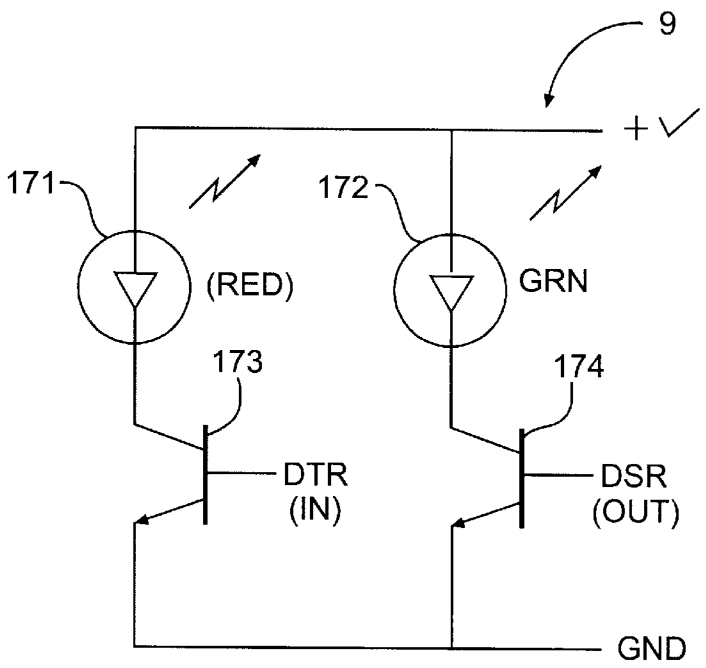
FIG. 21 is a schematic circuit diagram of the indicator of the fifth embodiment.

FIG. 21 is a schematic circuit diagram of the indicator 9 of the fifth embodiment. The indicator 9 includes an LED 171 for emitting a red ray to indicate the eating inside condition, a transistor 173 for turning on and off the LED 171 in response to a base signal DTR, an LED 172 for emitting a green ray to indicate the taking out condition, a transistor 174 for turning on and off the LED 172 in response to a base signal DSR. The port 8 supplies the base signals DTR and DSR in response to the microprocessor 1. The port 8 may be serial ports.

Figure 22:
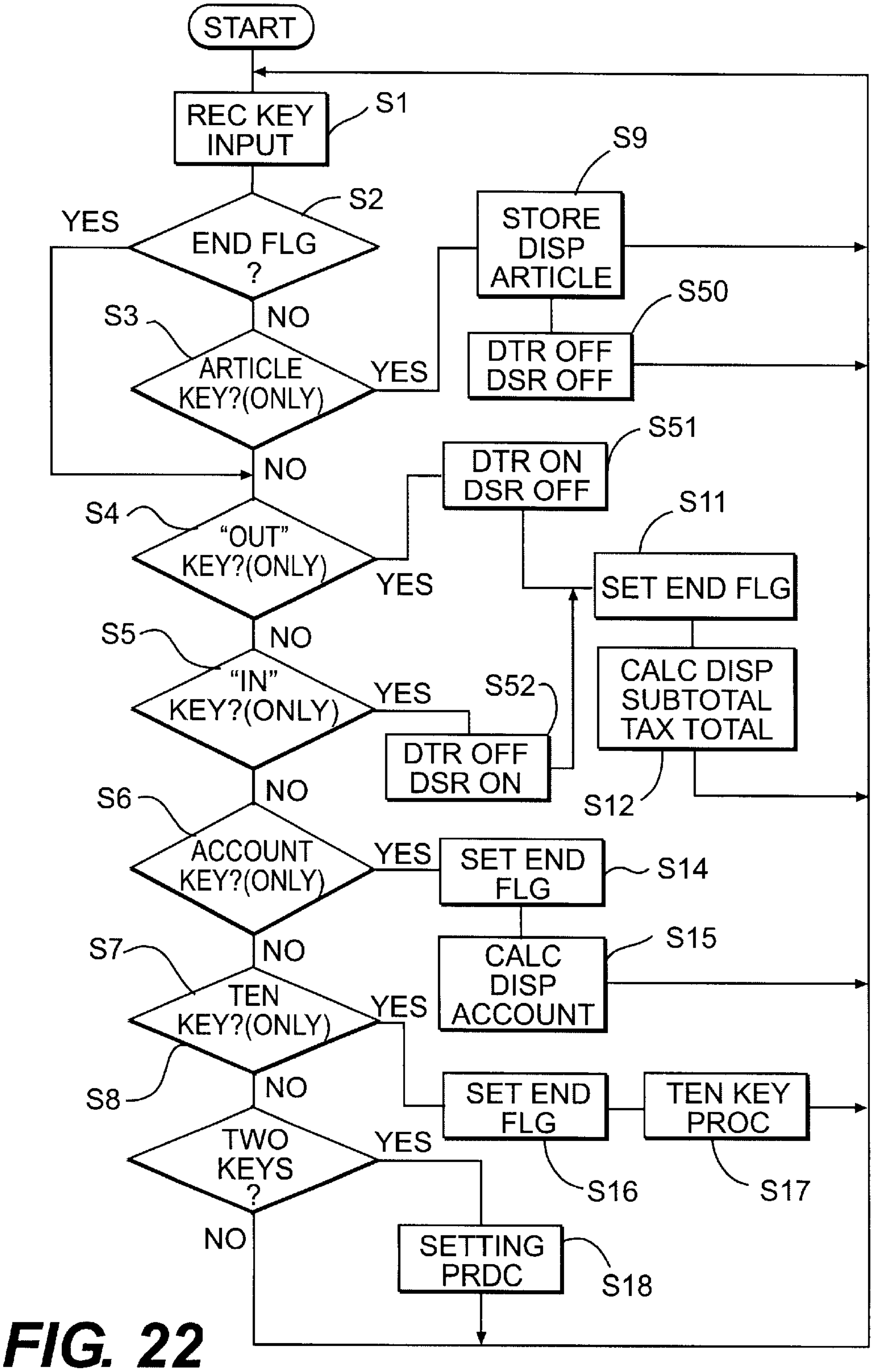
FIG. 22 depicts a flow chart of the fifth embodiment showing the operation of the microprocessor.

FIG. 22 depicts a flow chart of the fifth embodiment showing the operation of the microprocessor 1. The processing of the microprocessor 1 of the fifth embodiment is substantially the same as that of the fourth embodiment. The difference is that step s50 is added, steps s51 replaces the step s44, and step s52 replaces the step s45. That is, during the inputting the article keys, the base signals DTR and DSR are low levels and both LEDs 171 and 172 are in the off condition. In response to the first function key 203, the microprocessor 1 turns on the base signal DTR, that is, changes the level of the base signal DTR into H and remains the level of the base signal DSR at L in step S52 to emit the red ray to indicate the eating inside condition.

On the other hand, in response to the second function key 204, the microprocessor 1 turns on the base signal DSR, that is, changes the level of the base signal DSR into H and remains the level of the base signal DTR at L in step S52 to emit the green ray to indicate the taking out condition.

A modification will be described.

Figure 23:
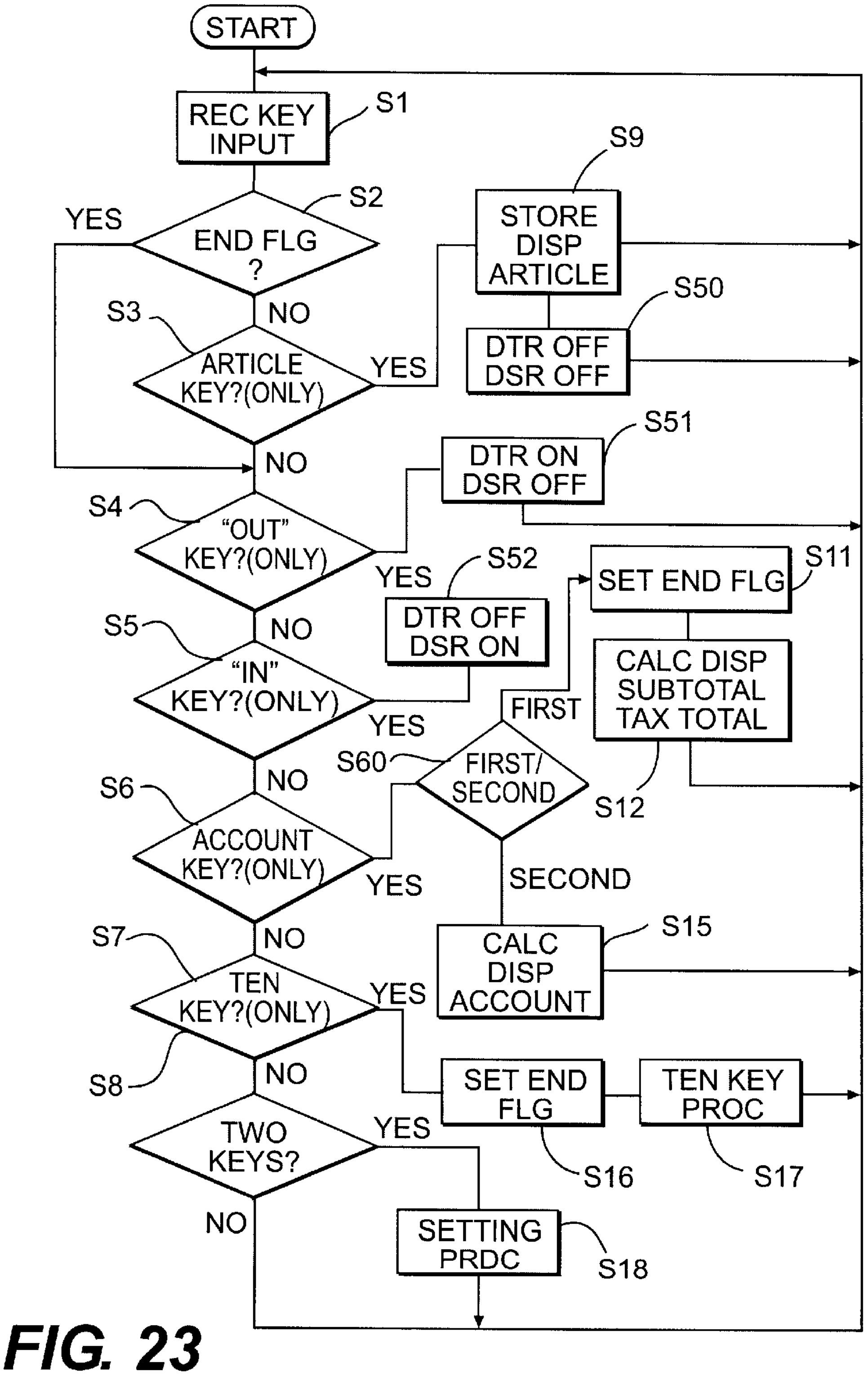
FIG. 23 depicts a flow chart of the modification showing the operation of the microprocessor.

FIG. 23 depicts a flow chart of the modification showing the operation of the microprocessor 1. The processing of the microprocessor 1 of the fifth embodiment is substantially the same as that of the fourth embodiment. The difference is that inputting the first and second function keys 203 and 204 are allowed before the article key input operation and the total is calculated and displayed in step s12 in response to the account key firstly depressed (steps s60 and s12) and calculates and displays the account in response to the account key secondly depressed (steps s60 and s15). This modification is provided by modifying the fifth embodiment. However, it is also possible to modify the first to fourth embodiments similarly.

What is claimed is:

1. An electronic cash register comprising:

a key board including article keys, a first function key indicative of eating inside a shop and a second function key indicative of taking out, and a total key;

processing means responsive to said key board for effecting one of predetermined processes including an article key receiving process and a total key response process;

font data storing means for storing sets of font data;

a code table;

setting means responsive to a user through said key board for user-initiated setting a first code indicative of a relation between said first function key and a first set of said font data and a second code indicative of a relation between said second function key and a second set of said font data in said code table in a setting mode, said setting means entering said setting mode in response to a predetermined key operation; and display means having a screen responsive to said processing means for displaying images for said article key receiving process and said total key response process on said screen, and displaying either of said first set of font data on said screen in accordance with said first code from said setting means in response to said first function key or said second set of font data on said screen in accordance with said second code from said setting means in response to said second function key in a non-setting mode, wherein said first and second sets of said font data indicate font images other than character word images.

2. An electronic cash register as claimed in claim 1, further comprising: a non-volatile memory, wherein said setting means stores said first and second codes in said code table in said non-volatile memory.

3. An electronic cash register as claimed in claim 1, wherein said setting means non-temporarily stores said first and second codes.

4. An electronic cash resister comprising:

a key board including article keys, a first function key indicative of eating inside a shop and a second function key indicative of taking out, and a total key;

a code table;

setting means responsive to a user through said key board for user initiated setting a code indicative of a relation between one of sets of said font data and one of said predetermined processes in the code table in a setting mode which is set in response to a predetermined key operation, said predetermined processes including article key receiving process for receiving input of said article key, a first function key receiving process for receiving input of said first function key, a second function key receiving process for receiving input of said second function key, and a total key response process responsive to said total key;

processing means responsive to said key board for effecting one of the predetermined processes;

condition judging means for judging that said article key receiving processing has been finished, judging that said input of said first function key is received, and judging that said input of said second function key is received; and display means having a screen responsive to said processing means for displaying, in a non-setting mode, images for said article key receiving process and said total key response process on said screen, said display means displaying a condition of said processing means in accordance with the judging result of said condition judging means with predetermined information other than character words.

5. An electronic cash register as claimed in claim 4, further comprising:

font data storing means for storing sets of font data; and wherein said display means reads said code from said setting means when the judging result indicates said one of predetermined processes, displays said set of font data on said screen in accordance with said code from said setting means.

6. An electronic cash register as claimed in claim 4, wherein said display means includes display attribution changing means for changing display attribution at a predetermined area of said screen image in accordance with the judging result of said condition judging means.

7. An electronic cash register as claimed in claim 6, wherein said display attribution changing means changes display attribution at said predetermined area of said screen image from a first background color to a second background color in accordance with the judging result.

8. An electronic cash register as claimed in claim 7, wherein alphanumeric characters on said image for displaying for said article key receiving process is displayed on said predetermined area.

9. An electronic cash register as claimed in claim 7, wherein alphanumeric characters on said image for displaying for said total key response process is displayed on said predetermined area.

10. An electronic cash register as claimed in claim 7, wherein alphanumeric characters on said image for said article key receiving process is displayed outside said predetermined area within said screen.

11. An electronic cash register as claimed in claim 4, further comprising another displaying means for emitting one of predetermined color rays in accordance with the judging result of said condition judging means.

12. A method of displaying processing result in an electronic cash register including a key board including article keys, a first function key indicative of eating inside a shop, a second function key indicative of taking out, and a total key and a processor responsive to said key board for effecting either of predetermined processes including article key receiving process for receiving input of said article key, a first function key receiving process for receiving input of said first function key, a second function key receiving process for receiving input of said second function key, or a total key response process responsive to said total key at least and a display, said method comprising the steps of:

providing a code table;

user-initiated storing a first code indicative of a relation between said first function key and a first set of said font data and a second code indicative of a relation between said second function key and a second set of said font data in said code table in a setting mode which is set in response to a predetermined key operation;

judging that said article key receiving processing has been just finished, judging that said input of said first function key is received, and judging that said input of said second function key is received; and displaying images for said article key receiving process and said total key response process on a screen, displaying a condition of said processor in accordance with the judging result with predetermined information other than character words using said first and second codes in a non-setting mode.

13. The method as claimed in claim 12, further comprising the steps of:

storing sets of font data;

generating and storing a code indicative of a relation between one of sets of said font data and one of said predetermined processes in response to said key board;

reading the stored first code when the judging result indicates said one of said predetermined processes; and displaying said first set of font data on said screen in accordance with said first code from said setting means.

14. The method as claimed in claim 12, further comprising the step of:

changing display attribution at a predetermined area of said screen image in accordance with the judging result.

15. The method as claimed in claim 14, wherein alphanumeric characters on said image for displaying for said total key response process is displayed on said predetermined area.

16. An electronic cash register as claimed in claim 14, wherein alphanumeric characters on said image for said article key receiving process is displayed outside said predetermined area within said screen.

17. The method as claimed in claim 12, wherein said display attribution at said predetermined area of said screen image is changed from a first background color to a background color in accordance with the judging result.

18. The method as claimed in claim 14, wherein alphanumeric characters on said image for displaying for said article key receiving process is displayed at said predetermined area.

19. The method as claimed in claim 12, further comprising the steps of emitting one of predetermined color rays in accordance with the judging result of said condition judging means.

20. An electronic cash resister comprising:

a key board including article keys, a first function key indicative of eating inside a shop and a second function key indicative of taking out, and a total key;

a code table;

setting means responsive to a user through said key board for user initiated setting a code indicative of a relation between one of sets of said font data and one of said predetermined processes in the code table in a setting mode which is set in response to a predetermined key operation, said predetermined process including article key receiving process for receiving input of said article key, a first function key receiving process for receiving input of said first function key, a second function key receiving process for receiving input of said second function key, and a total key response process responsive to said total key;

processing means responsive to said key board for effecting one of the predetermined process;

condition judging means for judging that said article key receiving processing has been just finished in response to said first or second function key; and display means having a screen responsive to said processing means for displaying images for said article key receiving process in a non-setting mode, distinctively displaying a condition of said processing means in accordance with the judging result of said condition judging means with predetermined information other than character words to indicate any one of said article key receiving process, said first function key receiving process, and said second function key receiving process, and as well as displaying said total key process of said received input of said article key on said screen when the judging result of said condition judging means indicated that said article key receiving processing has been just finished in response to said first or second function key.

* * * * *